Figure 6:
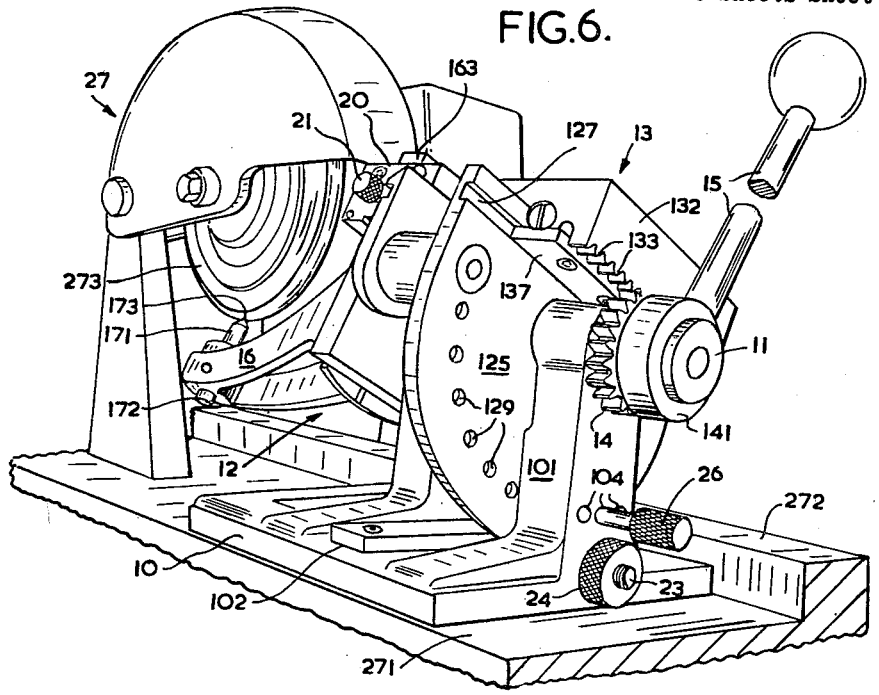

June 8, 1965     I. OSCAR     3,187,737
MACHINISTS' TOOL
Filed July 20, 1962     6 Sheets-Sheet 1
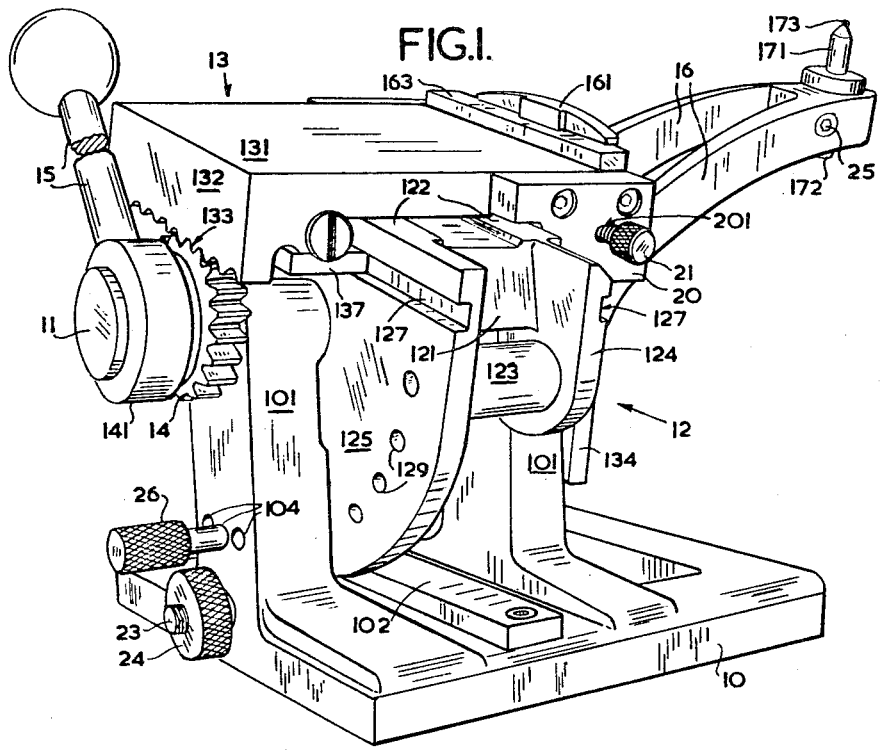
INVENTOR
ISIDORE OSCAR
BY
Kenway, Jenney & Hildreth
ATTORNEYS

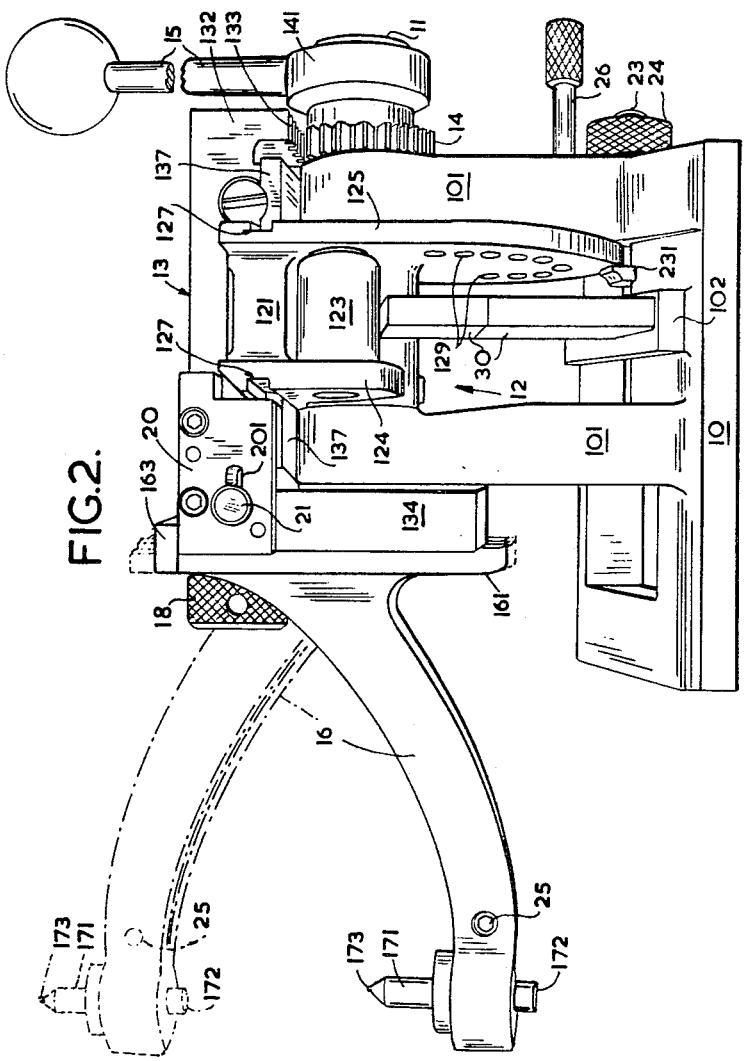

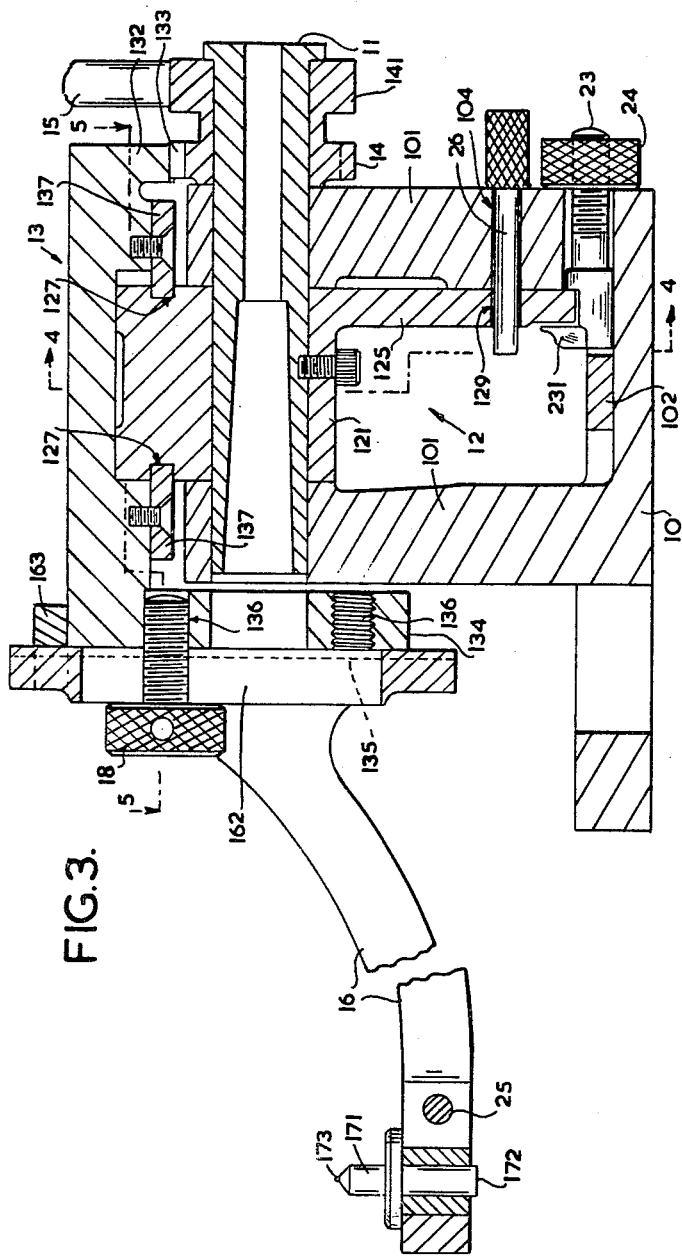

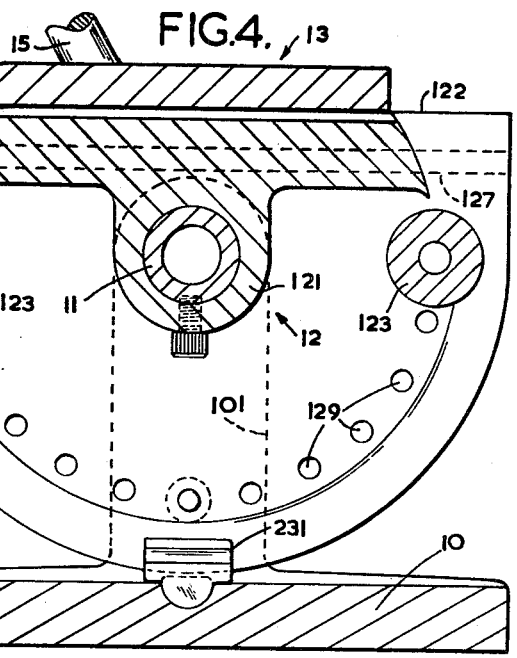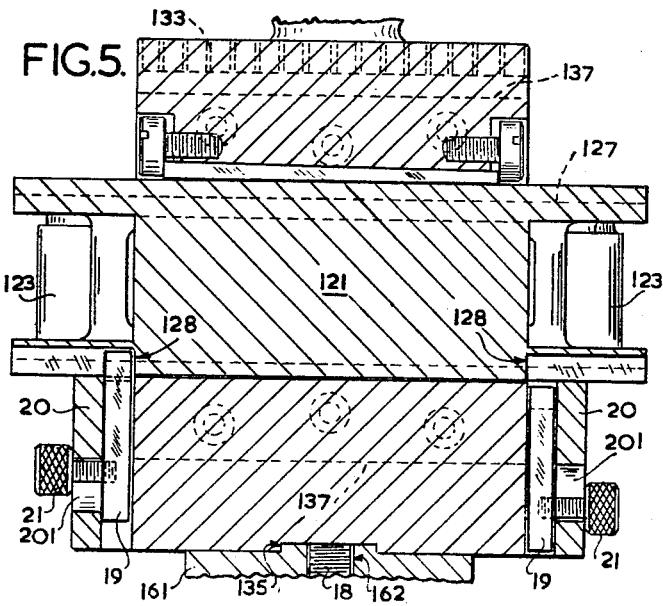

June 8, 1965  I. OSCAR  3,187,737
MACHINISTS' TOOL
Filed July 20, 1962  6 Sheets-Sheet 5

INVENTOR
ISIDORE OSCAR
BY
Kenway, Jenney & Hildreth
ATTORNEYS

United States Patent Office 3,187,737
Patented June 8, 1965

3,187,737
MACHINISTS' TOOL
Isidore Oscar, 202 Melchett Road, Factory Centre,
Kings Norton, Birmingham 30, England
Filed July 20, 1962, Ser. No. 211,258
Claims priority, application Great Britain, Aug. 4, 1961,
28,324/61
5 Claims. (Cl. 125—11)

This invention has reference to a machinists' tool for grinding wheel dressing, work setting, work checking and analogous purposes and has for its primary object to provide a machinist's tool which, when required for the dressing of grinding wheels, can be fitted readily to a grinding machine or to a milling machine for effecting both concave and convex radius dressing of a grinding wheel and angular dressing of such a wheel if required at a single setting of the tool and which is adaptable for work setting purposes such as is provided by a dividing head, for the checking of work which has been machined and for the holding of work to be machined.

Accordingly the invention consists of a machinist's tool for grinding wheel dressing, work setting, work checking and analogous purposes comprising in combination an accurately machined base, upstanding support means carried by the said base, a sine bar device turnably supported by said upstanding support means about a horizontal axis and having a pair of spaced setting elements which may be used in conjunction with gauge blocks for fine adjustment setting of the sine bar device, means for retaining said sine bar device in a set position after a fine setting, means for setting said sine bar device arbitrarily in one or other of a number of predetermined standardized angular settings, means for retaining the sine bar device in the chosen one of the said predetermined standardized angular settings, a table slidably mounted on the sine bar device aforesaid with the unobstructed upper surface thereof located in a plane parallel to the plane containing the axes of the setting bar device aforesaid, said table serving as a work holder or as a support for instruments for work setting and checking as a machinist may require, means for detachably and adjustably attaching a tool carrier to said table, means for securing a detachable work holder in substitution for said tool carrier at the same location as said tool carrier, means for effecting a turning of the sine bar about a horizontal axis and means for occasioning a reciprocation of said table relatively to the said sine bar device when this is permissible and means for prohibiting the reciprocation of said table when the needs of the machinist so require.

The invention further resides in a machinist's tool constructed, arranged and adapted for use substantially as will be described hereinafter.

An embodiment of the invention will now be described with particular reference to the accompanying drawings which illustrate the invention in a form primarily intended for the dressing of grinding wheels and which is capable of being set up on a grinding machine of known proprietary make through the medium of a magnetic chuck also of known construction and manner of operation.

Figure 7:
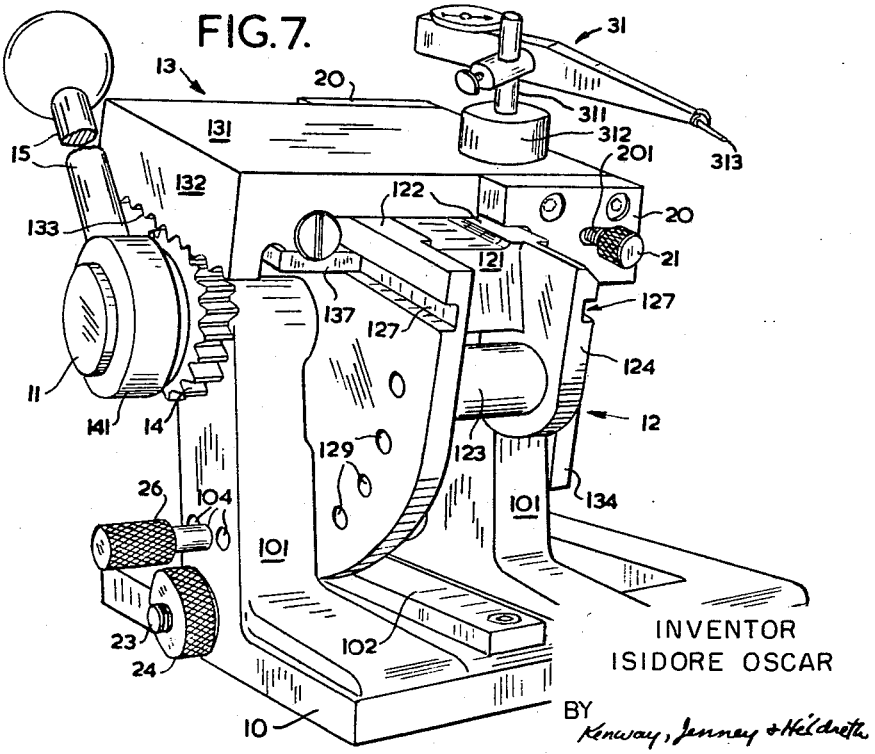
Figure 8:
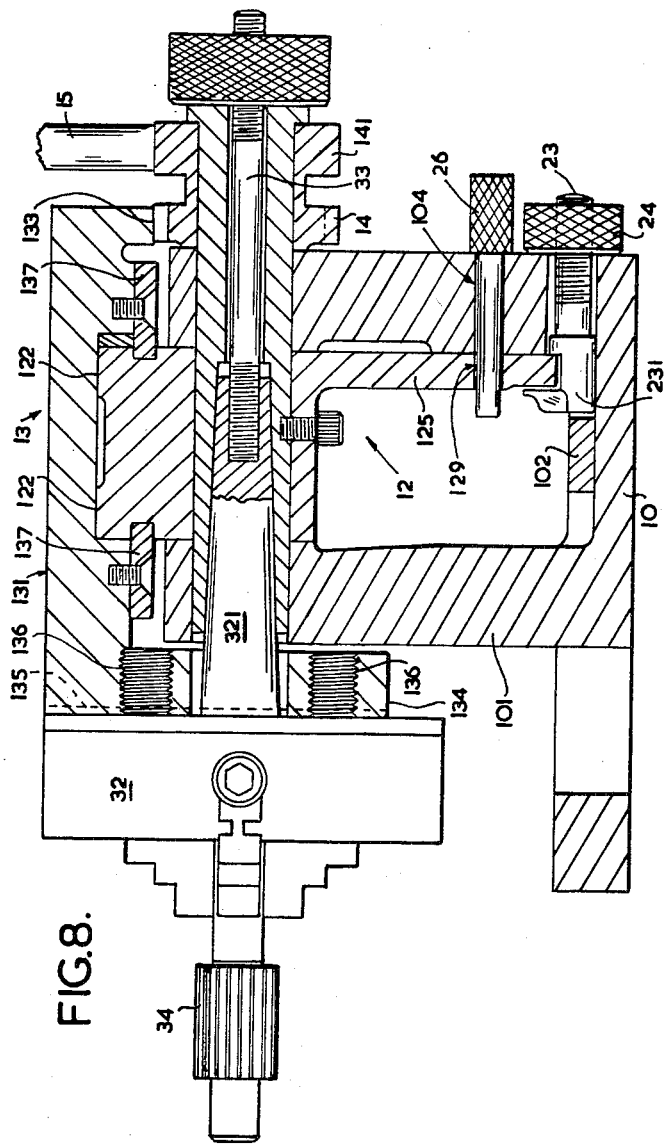

In the drawings:
FIGURE 1 is a perspective view of the machinists' tool looking from one end,
FIGURE 2 is a perspective view of the machinists' tool looking from the opposite end to that seen in FIGURE 1 and with the tool carrier in the reverse position to that shown in FIGURE 1 and illustrating the manner of using gauge blocks for determining the setting of the sine bar device if required,
FIGURE 3 is a transverse vertical section of the machinists' tool illustrated in FIGURES 1 and 2, FIGURE 4 is a longitudinal section taken on the general plane indicated by the line 4—4 in FIGURE 3 looking in the direction of the arrow to the said line,
FIGURE 5 is a fragmentary view in section taken on the plane indicated by the line 5—5 in FIGURE 3 looking in the direction of the arrow to the said line,
FIGURE 6 is a perspective view showing the machinists' tool set up on a grinding machine of known proprietary make through the medium of a magnetic chuck also of known construction and manner of operation for trueing the grinding wheel mounted on the said machine,
FIGURE 7 is a perspective view showing the machinists' tool employed for work setting or for work checking, and
FIGURE 8 is a transverse sectional view illustrating the machinists' tool set up for use as a dividing head for the grinding of splines.

In the drawings like numerals of reference indicate similar parts in the several views.

According to the illustrated embodiment of the invention the machinists' tool incorporates a rectangular base 10 of a paramagnetic material which is accurately machined on all surfaces.

Fixed to and upstanding from the base 10 is a pair of upstanding standards 101 the upper ends of which are spaced apart.

These standards 101 are provided with bearings for a horizontal turnable tubular shaft 11. Fixed to the central portion of the shaft 11 is the hub 121 of a sine bar device which is designated generically by the reference numeral 12 said sine bar device 12 having machined upper surfaces 122 and oppositely and symmetrically disposed horizontal setting "rollers" 123 which are supported at one end by depending portions 124 located at the ends of the sine bar device and which are supported at their other ends by a quadrant 125 integral with the said hub 121 and to which reference will be made hereinafter.

Opposite sides of the sine bar device are provided, at their upper portions, with slideways 127. These are disposed at equal heights above the axis of the tubular shaft 11 and so in a plane which, before any rocking movement is imparted to the sine bar device 12 about the shaft axis, is a horizontal plane. A table 13, arranged to ride above the sine bar device 12 has downwardly depending side portions to which inwardly toeing splines 137 are removably affixed, and these splines mate with and slide in the ways 127. The ways 127 and the splines 137 thus guide the table 13 in movements that are transverse to the rocking axis of the sine bar device 12, constraining it against all other movements and supporting it on the sine bar device in the fashion of a simple beam. The upper surface 131 of the table 13 is disposed in a plane parallel to the plane containing the setting rollers 13, and is accurately machined. The said table 13 may serve as a work holder or as a support for instruments for work setting and checking as and when required.

Conveniently the axes of the setting rollers 123 are spaced apart to the customary 5 inches.

At one side the table 13 is provided with a short depending portion 132 provided on the underside thereof with a rack 133 the teeth of which mesh with the teeth of a pinion 14 turnably mounted on a projecting outer end portion of the tubular shaft 11.

The pinion 14 is provided with a cylindrical enlargement 141 which is tapped for the reception of the screw-threaded end of a handle 15.

At the opposite side to that carrying the rack 133 the table 13 is provided with a depending portion 134 having machined outer and bottom surfaces the outer surface being provided with a central slideway 135 within which is adapted to be mounted the base 161 of a diamond holder 16 the outer end whereof is provided with a mounting for the holder 171 of a diamond tipped dressing tool 173.

The base 161 of the diamond holder 16 is provided with a central vertical slot 162 (see FIGURE 5) which may be brought into register with one or other of two tapped holes 136 in the depending portion 134 so that the diamond holder 16 may be secured to the said depending portion 134 by means of a knurled headed bolt 18. The base 161 of the diamond holder 16 is provided with an inwardly projecting portion 163 which is machined so as to be capable of seating in the adjacent marginal portion of the table 13 or of the bottom surface of the depending portion 134 for ensuring the accurate location of the diamond holder 16 relatively to the table 13.

As indicated in dotted lines in FIGURE 2 the tool carrier 16 may be reversed from the position indicated in FIGURE 1 in which case the projecting portion 163 co-operates with the machined bottom surface of the depending portion 134.

One of the slideways 127 of the sine bar device 12 is provided at each end with shoulders 128 which co-operate with slidable stop members 19 slidably mounted between detachable end pieces 20 which are screwed to the table 13 and the respective presented vertical end surfaces of the table 13 (see FIGURE 5). In FIGURE 5 the left hand slidable stop member 19 is shown in the obstructing position for limiting the degree of reciprocation to the left whilst the right hand slidable stop member 19 is shown in the "clear" position. The end pieces 20 are provided with elongated slots 201 through which may be passed the screw-threaded shanks of knurled headed screws 21 so that by slackening the screws 21 the slidable stop members 19 may be adjusted as required and subsequently locked in a desired position.

The depending quadrant 125 aforesaid is provided adjacent to the periphery thereof with a plurality of holes 129 which are set on an arc at a predetermined angular distance apart conveniently at intervals of 15°.

These holes 129 are adapted to register with one or other of three holes 104 formed in the adjacent standard 101.

The table 13 has bolted to the underside thereof renewable bearing strips 137 which engage within slideways 127 formed in the sides of the upper portion of the sine bar device 12.

Slidably mounted in the base 10 is a rod 23 provided on the inner end thereof with an upstanding clamping block 231 the inner face of which can abut the presented face of the quadrant 125.

The outer end of the rod 23 projects from the adjacent standard 101 and is screw-threaded for engagement by a knurled nut 24 whereby the clamping block 231 can be drawn into clamping engagement with the quadrant 125 as and for a purpose to be specified hereinafter.

The outer end of the diamond holder 16 is provided with a hole developed around a vertical axis within which is adapted to be seated the stem 172 of the diamond tool holder 171. The stem 172 is secured within the hole in the outer end of the diamond holder 16 by means of a clamping nut and bolt 25.

A peg 26 is provided for passage through the holes 129 and the registering holes 104 in the quadrant 125 as and when required.

The base 10 is provided with a longitudinal renewable strip 102 having a machined horizontal upper surface which serves as a bed for gauge blocks if and when required as will be referred to hereinafter.

Referring now to FIGURE 6 in which the machinists' tool is shown mounted on a grinding machine of known proprietary make, sufficient only of which is shown as is necessary to an understanding of the invention, for the dressing of the grinding wheel thereof.

The device is seated on the magnetic chuck 271 associated with the bed of the grinding machine indicated generically by the reference 27 on the feed end thereof with the side of the base 10 which is remote from the operator in abutment with the presented vertical face of a longitudinal guide 272 associated with the bed of the grinding machine 27.

The diamond holder 172 is then mounted in the tool carrier 16 and adjusted until the chisel edge of the diamond 173 is located in the medial vertical plane of the grinding wheel 263.

Conveniently this may be done by first adjusting the tool by sight to a position in which it is considered that the chisel edge of the diamond 173 is in the medial vertical plane of the grinding wheel 273 and then removing the machinists' tool from the grinding machine 27 and setting it up with the tool on the opposite side of the grinding wheel 273 and repeating the same adjustment operation so that by making such adjustments it can be assured that the chisel edge of the diamond 173 is located in the true medial vertical plane of the grinding wheel 273 when the machinists' tool is again set up on the feed side of the grinding wheel 273.

If concave radiusing is required the diamond holder 16 is set up as depicted in side elevation in FIGURE 1 with the table 13 locked against reciprocation in either direction by removing the stop members 19 to the obstructing positions relatively to the complementary shoulders or strips 128.

The machinists' tool is advanced to the grinding wheel 273 to be dressed by manipulation of the conventional grinding machine control. When the diamond 173 comes into contact with the wheel 263 to be dressed the table 13 and sine bar device 12 are oscillated as a unit by means of a handle 15 through the medium of the rack 133 and pinion 14 thus causing the diamond edge 173 to sweep through an arc which effects a concave radius dressing of the grinding wheel 263.

If a convex radius dressing is required the tool carrier 16 is reversed to the position indicated in full lines in FIGURE 2 and the foregoing operation repeated whereupon it will be found that the diamond will sweep an arc so as to effect a convex dressing.

If angular dressing is required, assuming that this is a standard angular dressing of either 7½° or a multiple thereof the sine bar device 12 and table 13 are turned until the requisite hole 129 in the quadrant 125 registers with a selected hole 104 in the adjacent standard 101 whereupon the quadrant 125 is locked in position by engaging the peg 26 aforesaid in the registering holes 129 and 104.

If a non-standard angular setting is required gauge blocks 30 as indicated in FIGURE 2 are mounted on the machine base 10 and the device turned until the setting "roller" 123 concerned bears on the top of the uppermost gauge block 30 whereupon the sine bar 21 and consequently the table 13 are locked in postion by tightening the nut 24 so as to cause the block 231 to clamp the quadrant 125 between itself and the presented surface of the adjacent standard 101. The table 13 is then reciprocated by oscillating the handle 15 so that the diamond 273 is caused to effect an angular dressing of the grinding wheel 263 at the required angle.

If it is desired to limit the degree of reciprocation to be permitted to the table 13 the slidable stop member 19 at the appropriate end of the table 13 may be moved to coact with the complementary shoulder or stop 128 to restrict reciprocation of the table in the direction of the slidable stop member 128 which occupies the obstructing position.

If desired the quadrant 125 may be eliminated and the sine bar device 12 set to the required angle with the aid of gauge blocks and locked in position by a clamping means analogous to that hereinbefore described.

The machinists' tool is capable of being set so that various varying combinations of radius dressing and angular dressings may be performed for example a grinding wheel may be dressed to have a central concave or convex dressing with angular settings of a similar degree on either side of the grinding wheel 273 or the grinding wheel 273 can be given an angular dressing on one side only and a concave or convex dressing on the opposite side of the wheel.

It will be understood that the alternative holes 104 provide for setting of the quadrant 125 to fractions of 7½°.

Moreover although the invention has been described as applied to the dressing of grinding wheels the machinists' tool is adaptable for other purposes than dressing wheels such as work setting and work checking.

For example, after dressing grinding wheels the diamond holder 171 may be removed and a work holding device fixed in its place whereupon the workpiece may be ground to the form dressed previously on the grinding wheel.

Further as illustrated in FIGURE 7 the machinists' tool may be employed for work setting and work checking purposes such as the checking of angles on work that is too large to be checked by conventional methods in which case the checking or setting instrument is mounted on the table 13. The checking or setting instrument depicted in FIGURE 7 is a "clock" gauge 31 of known proprietary make which is adjustably mounted on a rod 311 associated with a cylindrical magnet base 312 and incorporates a sensing point 313 for contacting the surface to be set or checked. The table 13 and quadrant 125 are adjusted as may be required.

In FIGURE 8 the machinists' tool is depicted as employed as a dividing head for work which is required to be splined or otherwise performed on by grinding for which purpose the diamond holder 16 is removed and a chuck 32 secured to the shaft 11 by engaging the conical shank 321 of the chuck within a complementary tapered portion 111 of the shaft 11 and passing a bolt 33 through the opposite end of the bore of the shaft 11.

The quadrant 125 and table 13 are locked and the quadrant set in the mid-position by passing the peg 26 through the appropriate holes 129, 104 whereupon the work 34 is advanced to the grinding wheel of a grinding machine in the conventional manner. Preparatory to grinding succeeding splines the quadrant 125 is adjusted so that the next hole 129 in the quadrant 125 is engaged by the peg 26 or by setting, using gauge blocks, see FIGURE 2, and so on until splines have been ground in 180° of the work whereupon the chuck may be moved to an alternative position for the grinding of the remainder of the splines.

I claim:

1. A machinists' tool for grinding wheel dressing, work setting, work checking and the like which comprises, in combination, a base, upstanding support members carried by and fixed to said base, a horizontal shaft rotatably supported by said members, a sine bar device fixed to said shaft for rotation therewith, said device bearing a pair of spaced setting elements disposed in a horizontal plane in position to mate with guage blocks for fine angular setting of said device, said device also having upstanding side members disposed in parallel vertical planes, the outer faces of said side members being provided with channels disposed in a common horizontal plane above said shaft and parallel with the plane containing said setting elements, a table having a substantially horizontal upper surface disposed above said sine bar device, said table having side members located outwardly of said vertical planes and depending downwardly to a plane below the plane of said channels, inwardly toed splines adjustably fixed to said side members in positions to mate with and to slide in said channels, said channels and splines constituting, simultaneously and together, (a) means providing simple beam support for said table on said sine bar device and (b) guiding means permitting transverse linear movements of said table relatively to said sine bar device and constraining said table against all other movements, and means for firmly attaching a dressing tool carrier to said table at a selected location thereof.

2. A machinists' tool as defined in claim 1 wherein the upper surface of the table is accurately machined to serve as a support for instruments for setting and checking work.

3. In combination with a machinists' tool as defined in claim 1, means for detachably securing a work holder to said table in substitution for said tool carrier at the same location as said tool carrier.

4. In combination with a machinists' tool as defined in claim 1, a pinion rotatably mounted on said shaft, and means for alternately imparting rotary movements to said sine bar device about the axis of said shaft and transverse movements of said table relatively to said sine bar device by like rotary movements of said pinion.

5. In combination with a machinists' tool as defined in claim 1, means for locking said sine bar device against rotary movements about the axis of said shaft, means for locking said table against transverse movements across said sine bar device, and common control means for generating the movements not thus locked.

References Cited by the Examiner

UNITED STATES PATENTS

| | | |
|---|---|---|
| 1,551,995 | 9/25 | Lovenston. |
| 2,404,148 | 7/46 | Thompson. |
| 2,608,189 | 8/52 | Statia _____ 125—11.4 |
| 2,706,858 | 4/55 | King. |
| 2,909,168 | 10/59 | Klaassen _____ 125—11.4 |
| 3,006,331 | 10/61 | Akert _____ 125—11.4 |

FOREIGN PATENTS 559,945   3/44   Great Britain.

LESTER M. SWINGLE, *Primary Examiner.*

FRANK H. BRONAUGH, *Examiner.*